(12) United States Patent
O'Callaghan et al.

(10) Patent No.: US 6,580,078 B1
(45) Date of Patent: Jun. 17, 2003

(54) FERROELECTRIC LIQUID CRYSTAL INFRARED CHOPPER

(75) Inventors: Michael J. O'Callaghan, Louisville, CO (US); William N. Thurmes, Longmont, CO (US)

(73) Assignee: Displaytech, Inc., Longmont, CO (US)

( * ) Notice: Subject to any disclaimer, the term of this patent is extended or adjusted under 35 U.S.C. 154(b) by 3 days.

(21) Appl. No.: 09/828,295

(22) Filed: Apr. 6, 2001

Related U.S. Application Data (60) Provisional application No. 60/195,885, filed on Apr. 7, 2000.

(51) Int. Cl.[7] .............................................. G02F 1/135
(52) U.S. Cl. ...................................... 250/351; 250/221
(58) Field of Search ................................ 250/351, 221, 250/227.17, 548, 550; 349/116, 182; 356/237.5, 477

(56) References Cited

U.S. PATENT DOCUMENTS

| | | | |
|---|---|---|---|
| 4,051,370 A | | 9/1977 | Bly ............................. 250/331 |
| 4,600,300 A | | 7/1986 | Rotello ......................... 356/23 |
| 5,130,830 A | * | 7/1992 | Fukushima et al. ........... 359/75 |
| 5,182,665 A | | 1/1993 | O'Callaghan et al. ........ 359/95 |
| 5,347,377 A | * | 9/1994 | Revelli, Jr. et al. ........... 359/42 |
| 5,416,620 A | * | 5/1995 | Osugi ........................... 359/72 |
| 5,418,380 A | * | 5/1995 | Simon et al. ................ 250/550 |
| 5,546,181 A | * | 8/1996 | Kobayashi et al. .......... 356/237 |
| 5,587,820 A | * | 12/1996 | May et al. ...................... 359/72 |
| 6,016,173 A | * | 1/2000 | Crandall ....................... 349/25 |
| 6,070,093 A | * | 5/2000 | Oosta et al. ................. 600/316 |
| 6,100,945 A | * | 8/2000 | Crandall ....................... 349/25 |
| 6,388,649 B1 | * | 5/2002 | Tanaka et al. ................. 345/89 |

FOREIGN PATENT DOCUMENTS

| | | | |
|---|---|---|---|
| JP | 5-18859 | * 5/1993 | .......... G11M/11/00 |

OTHER PUBLICATIONS

Fray, et al., Infrared Physics, "Some Properties of Liquid Crystals as Infrared Modulators", 1978, pp 35–40.
Pasko, et al., SPIE, "Liquid Crystal Infrared Modulation", 1979, pp 82–89.
Wu, Optical Engineering,"Infrared Properties of Nematic Liquid Crystals: An Overview", 1987, pp 120–128.
Sharp, et al., Optics Letters, "Electrically Tunable Liquid Crystal Wave Plate in the Infrared", 1990, pp 87–89.
Chenault, et al., Optics Letters, "Infrared Linear Diattenuation and Birefringence Spectra . . . ", 1992, pp 447–449.
Yoshino, et al., Japanese Journal of Applied Physics, "Characteristics of Electro–Optic Effect of Ferroelectric Liquid Crystals in Infrared Range", 1985, pp 45–48.
Armitage, Appl. Phys. Lett, "Alignment of Liquid Crystal on a Polarized Metal Film", 1990, pp 1723–1724.
Frisk, et al., Proceedings of SPIE, "Optical Characteristics of Wavelength–Optimized Reflective FLC SLMs", 1998 pp 1–5.

* cited by examiner

Primary Examiner—Constantine Hannaher
Assistant Examiner—Otilia Gabor
(74) Attorney, Agent, or Firm—Robert G. Crouch; Marsh Fischmann & Breyfogle LLP (57) ABSTRACT

A liquid crystal infrared light chopper includes a polarizer that receives and polarizes incoming infrared light, a layer of ferroelectric liquid crystal material switchable between at least two states, a pair of IR transparent, conductive substrates positioned on either side of the liquid crystal layer and an analyzer that blocks IR light of one polarization state and passes IR light of an opposite polarization state. The liquid crystal layer acts on polarized IR light by changing its polarization if the liquid crystal is in a first state and by not changing its polarization if the liquid crystal is in a second state. Voltages applied to the conductive substrates drive the liquid crystal layer to one of the two states. The analyzer blocks IR light when the liquid crystal layer is in one of the states and passes IR light when the liquid crystal layer is in the second state.

36 Claims, 6 Drawing Sheets

Compound A

Compound B

Compound D

Compound C

Compound E

FERROELECTRIC LIQUID CRYSTAL INFRARED CHOPPER

This application claims priority from U.S. Provisional Patent Application No. 60/195,885, filed Apr. 7, 2000, and entitled "Ferroelectric Liquid Crystal Infrared Chopper," the contents of which are incorporated herein by reference.

FIELD OF THE INVENTION

This invention relates to infrared light modulators, and more particularly to infrared liquid crystal light modulators, including reflective and transmissive ferroelectric liquid crystal infrared "choppers."

BACKGROUND OF THE INVENTION

Like visible light, infrared light is a form of electromagnetic radiation. It occupies the portion of the electromagnetic wavelength spectrum between 750 nm and 1000 µm. However, unlike visible light, infrared radiation is not visible to humans. Nevertheless, useful scientific information may be obtained by observing with specialized instruments the infrared radiation emitted from or reflected by objects from atoms to stars. Although the term "light" is often used to refer only to visible electromagnetic radiation, for ease of discussion in this application the term infrared light will be used along with infrared radiation, to refer to electromagnetic radiation in the infrared region.

One form of infrared measurement, known as radiometry, measures the intensity of infrared light a source emits, absorbs, or reflects by comparing the observed infrared light to a reference measurement. Radiometry is useful, for instance, in analyzing the chemical constituents in a gas sample. This subclass of radiometry is known as spectro-radiometry.

Spectro-radiometry makes use of the fact that all elements or compositions of matter have an infrared "signature" or "fingerprint". Matter absorbs or reflects infrared radiation to some degree, depending on the wavelength of the radiation. By observing the pattern of infrared light reflected from or absorbed by a sample of unknown composition, it becomes possible to determine what elements and/or compounds are present in the sample. A spectro-radiometer used for such investigation directs various wavelengths of infrared light at the sample and observes to what degree the radiation is absorbed at each wavelength. Alternatively, a spectro-radiometer may direct infrared light containing a number of different wavelengths at the sample and observe the infrared light after passing through the sample using a number of infrared detectors, each configured to observe specific wavelengths.

Radiometers, like other types of infrared detectors that compare reflected infrared light to a reference measurement, generally require an alternating infrared source. Infrared light from the source is alternately directed at the detector through the sample and blocked from passing to the detector. The detector then compares the difference between the two measurements to produce an output signal representative of the difference. In order to increase the accuracy of such systems, it is important to have a consistent, and stable source of infrared light. That is, the alternating infrared waveform should have equal intensity and spectral composition from one ON pulse to the next, each OFF pulse should be equally dark, and the transitions between ON and OFF pulses should be consistent.

One method for providing an alternating infrared light source is to flash the actual source. However, the internal heat generated by infrared sources along with other factors limit the source's ability to emit infrared light of constant intensity or wavelength throughout a pulse when the source is pulsed ON and OFF. Therefore, this is an unreliable method of providing stable, alternating infrared light for many applications.

Another method for providing an alternating infrared source is through the use of mechanical "choppers", such as shutters or rotating wheels with apertures to alternately block and pass the light. Mechanical choppers work well for many applications. However, many infrared sensor applications require very small choppers, for which mechanical choppers are not very well suited. Further, the moving parts in mechanical choppers may introduce unwanted vibration into the detection system, thus reducing the detector's usefulness. Additionally, components with moving parts are inherently less reliable than those with no moving parts. Finally, mechanical choppers are more difficult to control than similar electromechanical devices, making it more difficult to control the speed and accuracy with which they operate.

The use of mechanical choppers for visible light results in many of the same limitations and disadvantages. For that reason, it is well known to use liquid crystals for visible light choppers. However, liquid crystals have a number of limitations that make them potentially unsuitable for use in infrared choppers, and to applicants' knowledge, liquid crystals have not been used in infrared choppers. Liquid crystal chopper components behave differently in infrared wavelengths in ways that make them potentially unsuitable for liquid crystal infrared choppers. First, inexpensive polarizers used in visible light applications are not effective at infrared wavelengths, and alternatives are expensive. Further, liquid crystals have high absorption of light in infrared wavelengths, thus substantially reducing the amount of infrared light available. Finally, the window material used to contain the liquid crystal must be something other than glass, which also absorbs infrared light, and alternatives to glass are also expensive.

Therefore, the need exists for an infrared chopper that is small, reliable, and as free of moving parts as possible. If this is to be done with liquid crystals, there are many technical challenges to be solved before a chopper can be produced that is sufficiently economical to be used in various systems. It is against this background and a desire to solve the problems of the prior art that the present invention has been developed.

SUMMARY OF THE INVENTION

The present invention relates generally to a liquid crystal infrared light modulator that can be driven by electrical signals to modulate incoming infrared light. The modulator includes a polarizer receptive of the incoming light that produces polarized light and a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state. It also includes a pair of IR transparent, conductive substrates positioned on either side of the liquid crystal layer that are suitable for having voltages applied thereto to drive the liquid crystal layer to one of the two states. It further includes an analyzer that substantially blocks polarized light of the first polarization state when the liquid crystal layer is in the first state and substantially passes polarized light of the second polarization state when the liquid crystal layer is in the second state.

The liquid crystal material may be ferroelectric. The ferroelectric liquid crystal material may have a birefringence greater than 0.17 at a wavelength of 589 nm. The ferroelectric liquid crystal material may have an average transmissivity across the electromagnetic spectrum from 8–13 μm greater than 50%. At least one of the conductive substrates may include Germanium. The Germanium may be doped to increase the conductivity thereof. At least one of the polarizer and the analyzer may be constructed by a lithographic process. The polarizer and analyzer may be in a crossed-polarizer configuration relative to one another.

The present invention is also related to a liquid crystal infrared light modulator that can be driven by electrical signals to modulate incoming infrared light. The modulator includes a polarizer receptive of the incoming light that produces polarized light and a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state. It also includes an analyzer that substantially blocks polarized light of the first polarization state when the liquid crystal layer is in the first state and substantially passes polarized light of the second polarization state when the liquid crystal layer is in the second state. It further includes a first conductive substrate positioned on one side of the liquid crystal layer, the first substrate having a reflector thereon that reflects IR light such that incoming polarized light passes twice through the liquid crystal layer before passing through the analyzer and a second conductive substrate transparent to IR light positioned on the opposite side of the liquid crystal layer from the first substrate, the first and second substrates cooperating to modulate the liquid crystal layer between the two states.

The present invention also relates to a liquid crystal infrared light modulator that modulates incoming polarized IR light such that the IR light is either substantially blocked or passed by an analyzer after traveling through the modulator. The modulator includes a pair of conductive substrates and a layer of liquid crystal material positioned between the substrates, the liquid crystal layer operating between at least two states, a first state that provides a first polarization state of polarized light from the incoming polarized IR light and a second state that provides a second polarization state of polarized light from the incoming polarized IR light. The conductive substrates can be driven by electrical signals to modulate the liquid crystal between the two states, the substrates and the liquid crystal layer configured in either of two configurations, a transmissive configuration, wherein the IR light passes through the liquid crystal layer only once, and a reflective configuration, wherein the IR light passes through the liquid crystal layer twice.

The present invention also relates to an infrared detection system that analyzes the characteristics of a composition of matter. The detection system includes a source of infrared light and an IR chopper that alternately substantially passes and substantially blocks light from the IR light source. The chopper includes a polarizer receptive of incoming infrared light that produces polarized light, a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state, a pair of IR transparent, conductive substrates positioned on either side of the liquid crystal layer for modulating the liquid crystal layer between the two states, and an analyzer that substantially blocks polarized light of the first polarization state when the liquid crystal layer is in the first state and substantially passes polarized light of the second polarization state when the liquid crystal layer is in the second state. The detection system also includes an IR detector that senses the IR light after the IR light passes through the composition of matter. The composition of matter is located such that the IR light passes therethrough either before or after the IR light passes through the liquid crystal IR chopper.

The present invention also relates to a liquid crystal infrared light modulator that can be driven by electrical signals to modulate incoming infrared light. The modulator includes a reflective polarizer receptive of the incoming light that produces polarized light and a liquid crystal cell. The cell includes a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state. The cell also includes a first conductive substrate positioned on one side of the liquid crystal layer, the first substrate having a reflector thereon that reflects IR light such that incoming polarized light passes twice through the liquid crystal layer before passing through the analyzer, and a second conductive substrate transparent to IR light positioned on the opposite side of the liquid crystal layer from the first substrate, the first and second substrates cooperating to modulate the liquid crystal layer between the two states. The modulator also includes a reflective analyzer that substantially blocks polarized light of the first polarization state when the liquid crystal layer is in the first state and substantially passes polarized light of the second polarization state when the liquid crystal layer is in the second state. At least two of the polarizer, the liquid crystal cell, and analyzer are positioned in a substantially coplanar relationship with one another.

DETAILED DESCRIPTION

An invention is described herein for a ferroelectric liquid crystal chopper. In the following description, numerous specific details are set forth in order to provide a thorough understanding of the present invention. Based on the following description, however, it will be obvious to one skilled in the art that the present invention may be embodied in a variety of specific configurations. In addition, well-known processes for producing various components and certain well-known optical effects of various optical components will not be described in detail in order not to unnecessarily obscure the present invention.

Figure 1:
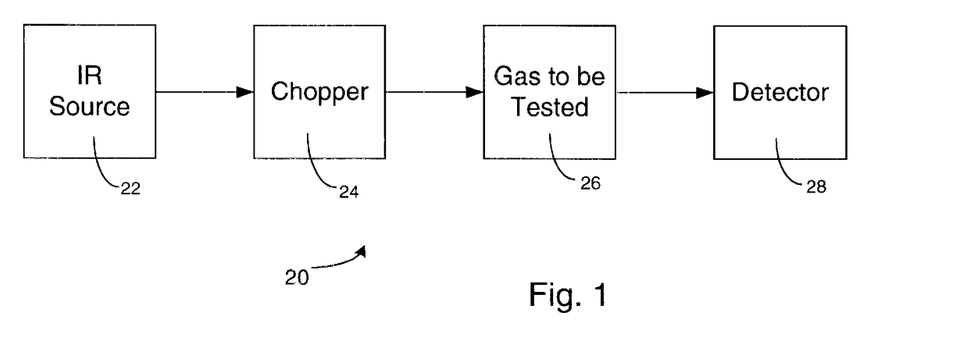
FIG. 1 is a block diagram of a gas monitoring system employing the ferroelectric liquid crystal (FLC) chopper of the present invention.

A system 20, shown in FIG. 1, includes an infrared (IR) light source 22, a chopper 24, a gas mixture 26 to be tested, and a detector 28. The light source 22 may provide continuous light across a broad portion of the infrared spectrum or it may step through portions of the infrared spectrum in a controlled fashion, either based on a sequence programmed internally or based on external control. The chopper 24, which will be discussed in greater detail below, modulates the continuous IR light into a series of alternating, sequential time periods with the light at either a first, higher intensity level or a second, lower intensity level. This modulated light is then passed through the gas mixture 26 to be tested. As is well known in the art of analysis of gas components, the gas mixture will absorb a particular percentage of the IR light passing therethrough, with the percentage varying with the wavelength of the light. The detector 28 detects the light not absorbed by the gas mixture. This spectral fingerprint of the gas mixture can be used to determine the components thereof in a fashion well known to those having skill in this art. It is also well known that most IR detectors such as the detector 28 are preferably operated to detect modulated rather than continuous IR light.

Figure 2:
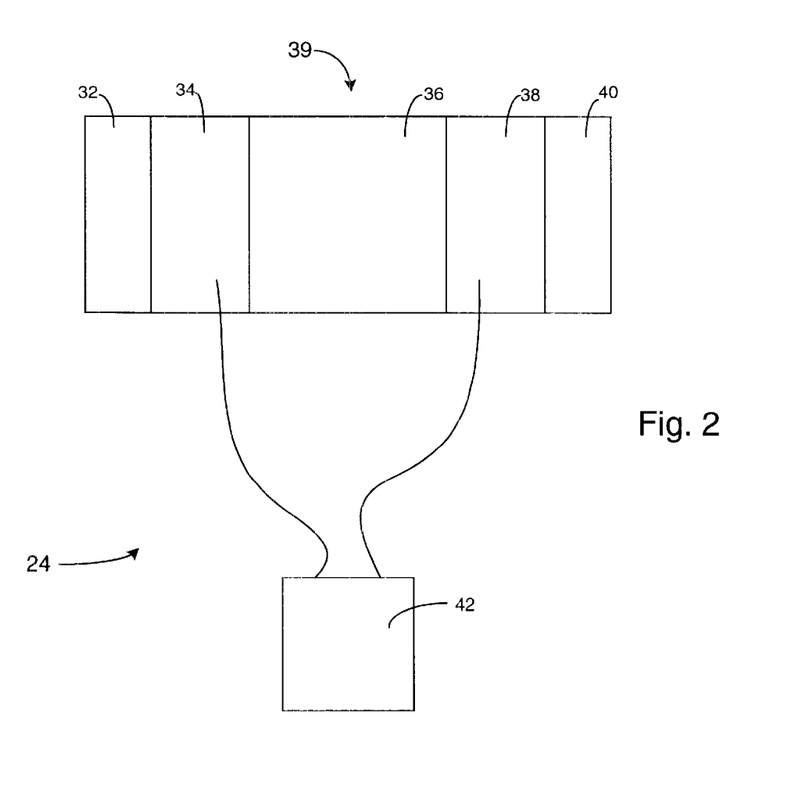
FIG. 2 is a diagram of the FLC chopper of FIG. 1.

The chopper 24 includes a first polarizer 32, a first transparent electrode 34, a layer of ferroelectric liquid crystal (FLC) material 36, a second transparent electrode 38, a second polarizer 40, and a voltage source 42, in a simplified embodiment shown in FIG. 2. As is known in the art of driving FLC devices, the voltage source 42 can control the optic axis of the FLC layer 36 to be generally in either a first orientation when an electric field of one polarity is applied or a second orientation when an electric field of an opposite polarity is applied. This may be accomplished by applying a square-wave voltage waveform to the electrodes 34 and 38 to create the electric fields of alternating polarity across the FLC layer 36. If the thickness of the FLC layer 36 is properly selected relative to the wavelength of the light passing therethrough, then the FLC layer 36 will act as a half-waveplate and incoming linearly-polarized light will be converted to outgoing linearly-polarized light that has been rotated about the optic axis. The first polarizer 32 creates the linearly-polarized incoming light from unpolarized light and the second polarizer 40 either blocks or passes the outgoing linearly-polarized light, depending on the relative orientations of the polarizers 32 and 40 and the optic axis of the FLC layer 36. The combination of the two electrodes 34 and 38 and the FLC layer 36 can be seen to be a simplified FLC cell 39.

Figure 3A:
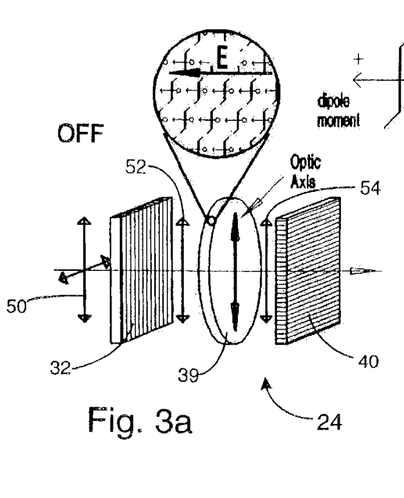
FIGS. 3a and 3b are illustrations of the operation of the FLC chopper of FIG. 2.
Figure 3B:
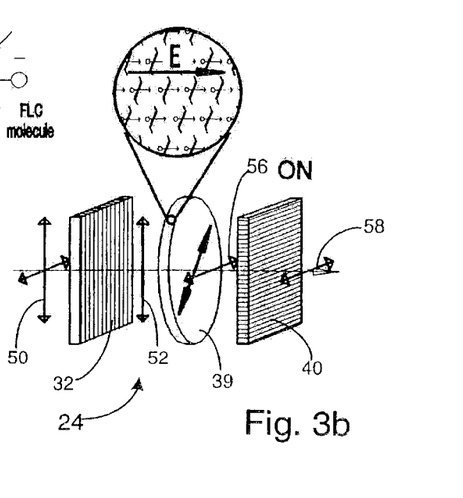

The general operation of the chopper 24 is illustrated in FIGS. 3a and 3b. In FIG. 3a, incoming unpolarized light 50 is directed to the first polarizer 32 which is oriented such that only vertically-polarized light 52 passes therethrough to the FLC cell 39. In this case, the FLC cell 39 has been oriented such that when a first electric field is applied thereto, the optic axis of the FLC cell 39 is vertical. This causes the vertically-polarized light 52 to be passed therethrough without change to its polarization state and orientation, resulting in vertically-polarized light 54. When this vertically-polarized light 54 strikes the second polarizer 40, no light is passed therethrough because the second polarizer is oriented such that only horizontally-polarized light is passed therethrough. It can be appreciated that this case produces an OFF state for the chopper 24.

In FIG. 3b, the vertically-polarized light 52 passing through the first polarizer 32 is rotated 90 degrees by the FLC cell 39 to create horizontally-polarized light 56. This rotation occurs because a second electric field, of opposite polarity to the first electric field, has been applied to the FLC cell which causes the optic axis of the FLC cell to rotate by approximately 45 degrees. Since the FLC cell is configured to behave as a half-waveplate, linearly-polarized light is converted to linearly-polarized light oriented at an angle rotated by twice the difference between the incoming light orientation and the optic axis of the FLC cell 39. Since the optic axis is now 45 degrees from the incoming light orientation, the light is rotated by 90 degrees to become horizontally-polarized light. This horizontally-polarized light 56 passes through the second polarizer 40 resulting in horizontally-polarized light 58 passing out of the chopper 24. It can be appreciated that this case produces an ON state for the chopper 24.

Figure 4:
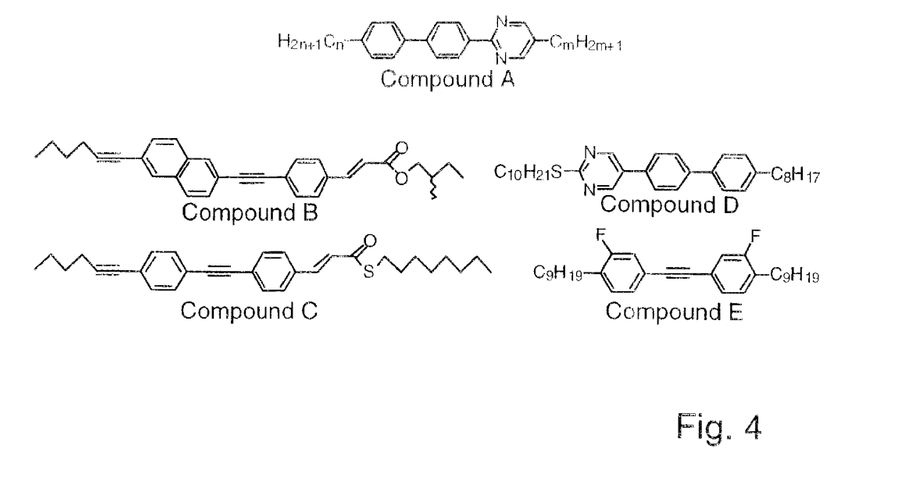
FIG. 4 is a collection of some useful FLC compounds that could be employed in the FLC chopper of FIG. 2.

Some suitable FLC compounds for use alone or in combination in the FLC layer 36 of the chopper 24 are shown in FIG. 4. As will be discussed in further detail below, it has been discovered that it is desirable to use FLC compounds with relatively lower absorption in the mid-infrared wavelength region as compared to other compounds and with a relatively higher birefringence in this wavelength region as compared to other compounds. These compounds in FIG. 4 have been determined to be better in these two characteristics than many other compounds.

Figure 5:
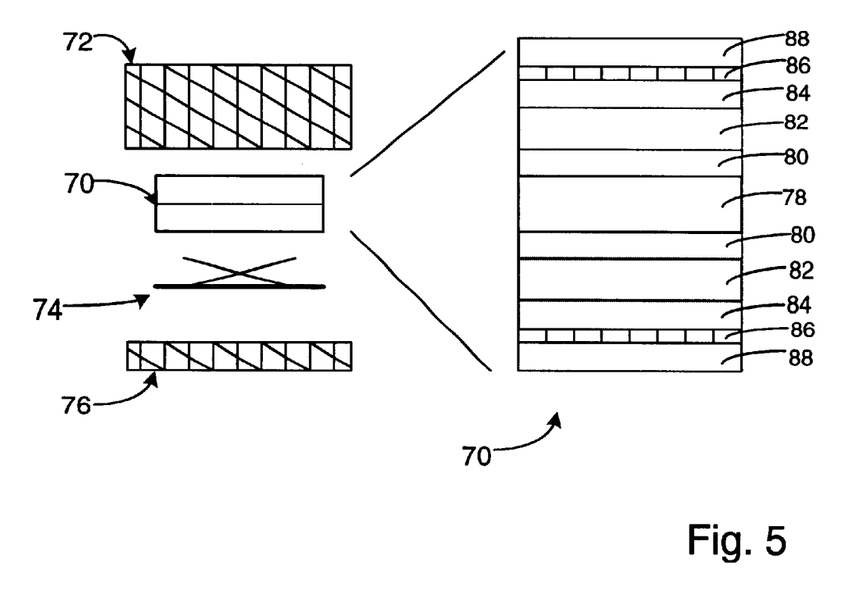
FIG. 5 is a diagram of a second embodiment of an FLC chopper of the present invention.

FIG. 5 shows an embodiment of an FLC IR chopper 70 having multiple layers of anti-reflective (AR) coating. The chopper 70 is held in place within a main fixture body 72 by an insulated support spring 74 and a fixture lid 76. The layers of the chopper 70 include an FLC layer 78 that is sandwiched between a pair of zinc selenide (ZnSe) AR layers 80 applied to the inner sides of a pair of germanium window/electrodes 82. The next layer (moving from the middle to the outer portion of the chopper 70) is another zinc selenide AR layer 84 applied to the outer sides of the germanium window/electrodes 82. To these layers 84, a layer of gold wire-grid polarizer 86 is applied. On the outside of the polarizer layers 86 is an AR layer of lanthanum fluorine (LaF) 88. The AR coatings were applied by Spectrum Thin Films of Bohemia, N.Y.

It has been discovered empirically that these various AR layers increase the transmission efficiency through the chopper 70. Generally, the effectiveness of an AR coating increases as the number of layers is increased in the dielectric stack of the AR coating. In this case, however, additional layers on the inside of each window/electrode adds to the capacitance between the electrodes which requires larger voltages to drive the FLC cell. Simulations showed that a single layer of ZnSe yielded acceptable transmittance without increasing the capacitance by an unacceptable amount. In addition, it was discovered that at least one type of photoresist material was highly transparent in the mid-infrared region and could be used to make an AR coating and protect the gold wire polarizer layer from mechanical damage. Nevertheless, because the thickness of this layer could not be suitably controlled, the photoresist was not used.

In addition, while it was determined that the order of the gold wire polarizer layer and the LaF layer could be reversed, it was found to be less desirable than in the order as described above because the gold wire layer appears to adhere better to the ZnSe than the LaF. Further, having the LaF on the outside served to protect the gold wire layer from mechanical damage.

Conducting lead wires are attached to each germanium electrode/window by silver epoxy. The wires exit the fixture via apertures in the fixture body or lid radially or axially near or at the perimeter of the fixture.

One very important design criterion for this chopper 24 is that it must include sufficiently practical and economical components so that it can be produced and sold for a reasonable price to make it feasible for use in consumer and commercial applications. Preferably, it should be suitable for mass production. In order to achieve this, several technical obstacles were overcome. First of all, it was recognized that optical materials suitable for the mid-infrared wavelength region (approximately 8 to 13 $\mu$m.) were necessary. Many of the optical materials typically used for optical systems operating in the visible region do not perform adequately in the infrared region. For example, glass which is used for lenses, windows, and as a transmissive substrate with films applied thereto (such as in a beamsplitter) is highly transmissive to visible wavelengths, but is much less transmissive in the mid-infrared region. Another example is the type of polarizers used. Polarizers for visible light do not work well for infrared light. The polarizers commercially available for use with infrared light are very expensive, and thus not practical.

Second, because of the absorptive nature of all organic compounds in the mid-infrared region, it was discovered that not only should compounds that are relatively less absorptive be used, but also it would decrease the total absorption if the thickness of the FLC layer 36 were decreased. This decrease in the thickness requires a proportional increase in the birefringence of the FLC layer 36. This can be appreciated from the following equation that expresses the intensity of light I passing through the chopper 24 when the incident light is unpolarized.

$$I = 1/2 \; I_0 \sin^2\left(\frac{\pi \Delta n d}{\lambda}\right) \sin^2(2\theta) \tag{1}$$

where $I_0$ is the incoming light intensity, $\Delta n$ is the FLC layer's optical birefringence, d is the FLC layer thickness, $\lambda$ is the light's wavelength, and $\theta$ is the angular orientation of the FLC layer's optic axis. Normally the FLC cell will be oriented so that $\theta=0$ in the shutter's OFF state (where $\sin^2(2\theta)=0$), and $\theta=45°$ in its ON state (so that $\sin^2(2\theta)$ attains its maximum value of 1).

As can be seen, the intensity is also a function of wavelength, so that with the longer wavelengths of mid-infrared, which are in the range of 10 to 30 times longer than visible wavelengths, the product of $\Delta n d$ must be 10 to 30 times larger than with visible wavelengths. Unless the birefringence can be increased by that amount, the thickness of the LC layer will have to be dramatically increased. This exacerbates the absorption problem of FLC materials at these wavelengths.

The goal was to make an FLC mixture with improved transmission in the mid-infrared wavelength range. In addition to this requirement, the mixture also had to meet normal requirements for FLC mixtures: easy alignment, wide temperature range (operating temperature at 50° C.), and appropriate tilt angle and switching speed. The approach to reducing IR absorption included two methods. The first was to decrease IR absorption of the individual FLC compounds or components. While predicting the spectrum of a given molecule in the 8 $\mu$m.–13 $\mu$m. region is difficult, since this is normally termed the "fingerprint region," certain empirical ties between structure and spectrum were made. For instance, it appears that oxygens, especially in the form of ether linkages, tend to decrease a molecule's transmissivity. Such empirical observations were used when designing new FLC compounds. The molecular design process was iterative—meaning we would design, synthesize, and evaluate one compound, and then use that information to help in designing new compounds. The second method to reduce IR absorption was increasing the birefringence of the materials. The higher the birefringence of the mixture, the thinner the FLC layer will be, and thus the shorter the light pathlength through the material. Altering the birefringence usually required increasing electron delocalization leading to higher birefringence materials. The goal was to have materials with both higher birefringence and lower IR absorption than average. By high birefringence, we refer to materials having a birefringence greater than or equal to approximately 0.17 when measured at approximately 589 nanometers (nm.).

In designing a new material, both the birefringence and the transmissivity of the new material had to be considered. The range of birefringence, from the smallest to the largest birefringence FLC compounds, varies by about a factor of three. In contrast, the range of transmissivity, particularly for a given wavelength (as opposed to an average over the entire region of interest) could be closer to a factor of fifty. Thus, the risks and rewards for designing a high transmissivity material were much greater than those for designing a high birefringence material. If a compound's low transmissivity could be directly tied to one functional group, that type of functional group would no longer be considered for future-generation compounds.

As part of the design step, we attempted to estimate the IR spectrum of potential new materials using molecular modeling programs such as MacSpartan and HyperChem. However, the estimates provided by these programs proved not to be helpful in this case. Our iterative empirical method ultimately proved to be much more useful.

Many new potential FLC compounds were synthesized, along with about 15 previously known compounds. Many of these new compounds have proven to have very high birefringence and very high IR transmissivity. These new compounds lay the groundwork for an FLC mixture optimized for IR use.

Representative examples of the new compounds made in this project are shown in FIG. 4. The first compound, Compound A, is a biphenylpyrimidine, which was used as the basis for the new mixtures. This material is almost ideal for this application. Due to its three delocalized rings, it has very high birefringence. Since there are no non-aromatic heteroatoms in the system, the IR transmissivity is very high and it has low viscosity. Several homologues were made of this material, where n and m each varied from 5 to 10 carbons. For example, in one useful compound n=7 and m=6, in another n=8 and m=9, and in a third n=7 and m=9. In addition, other variants of this material could be prepared. These compounds could be used for up to half of a mixture, but other materials are also needed to broaden phases and to provide other required liquid crystalline properties, depending on the intended application and operating environment, as is well known to those having skill in the art. In general the FLC material may be any single or mixture of FLC material that exhibits at least two optical states in response to electrical fields. Such materials are well known to those skilled in the art of FLC materials. The specific FLC material or mixture of FLC materials is highly dependent upon the operating environment of the device and/or specific characteristics desired in the device. For instance, environmental factors (e.g., temperature) and characteristics such as switching speed, switching voltage and contrast, substantially affect the choice of FLC material or mixture to be used. Materials best suited for each of these and other characteristics are well known to those skilled in the art of FLC materials, as are the methods used to combine FLC materials into suitable mixtures that best satisfy specific objectives.

Compound B is an example of a compound that was made but rejected for use in this project. This compound has a cinnarnate group (the combination of phenyl-ethene-carboxylate) coupled with a naphthalene via an alkyne group, and has a further alkyne group attached to the naphthalene. This very long delocalization results in a material with extremely high birefringence. Although its birefringence was high, the naphthalene group had a fair number of absorptions in the fingerprint region, giving this compound low IR transmissivity. Again, higher birefringence is good, but only if transmissivity is also high. In this case, the low transmissivity more than offsets any gains due to higher birefringence.

Compound C is similar in structure to Compound B, has a slightly lower birefringence, and its phenyl ring makes it much more transparent to IR light. If its birefringence and transmissivity were its only important properties, this would be an ideal constituent of an LC material for IR applications. Unfortunately, this compound is relatively insoluble in other liquid crystals. Other similar compounds, designed to have higher solubility, were also synthesized, but tended to have lower transmissivity than Compound C.

Compound D is representative of another promising class of materials. The only heteroatoms in this compound are the aromatic nitrogens and the sulfur link to the tail. Materials with sulfur linkages have much higher transmissivities than the equivalent oxygenated species, and have comparable birefringences. Thus, this compound, and several others like it, proved to be quite useful in the new mixtures.

The last type of compound shown in FIG. 4 is Compound E, which is a fluorinated tolane compound. The tolane system (phenyl-acetylene-phenyl) imparts very high birefringence, and substituting fluorines for hydrogens was expected to both reduce the amount of C-H absorbencies in the IR, and increase the tendency of the compound to form tilted smectic phases. It appears that, in regards to the first expectation, fluorination simply changed the type of absorbencies in the IR, without resulting in a net reduction. This material, like many of the other tolanes we looked at, still tended to broaden a mixture's N phase while decreasing the desired smectic C phase.

The IR spectra of the new compounds were measured under standardized conditions. In a typical measurement, a 50 $\mu$m thick sample of a compound was melted, and the melt's spectrum was taken. The transmission was then averaged over several portions of the spectrum, including several specific notches which coincide with peaks in the IR spectra of the anesthetic gases. The averaged spectra were then compared with each other, and the compounds with the best results were either used in mixtures or structurally modified to give even better compounds.

Figure 6A:
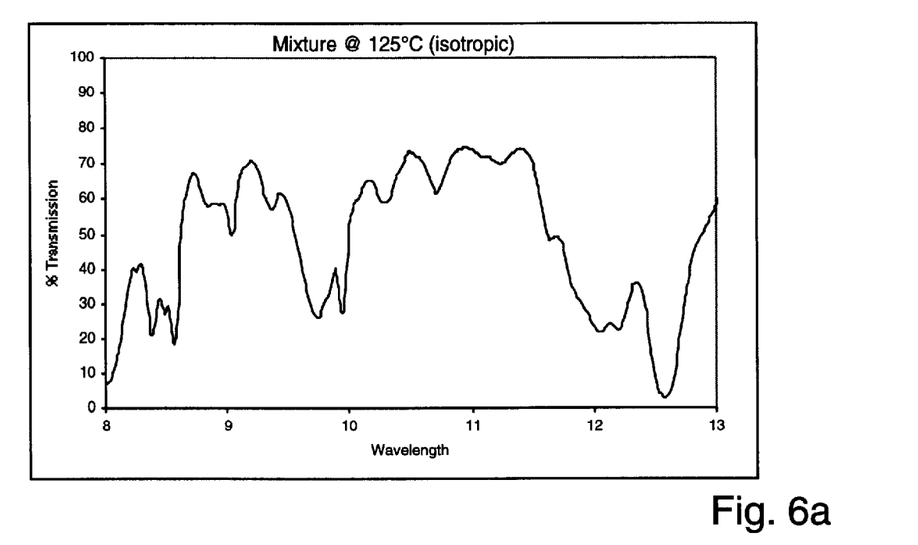
FIGS. 6a and 6b are the transmittances of an FLC mixture in the smectic C and isotropic phases, respectively.
Figure 6B:
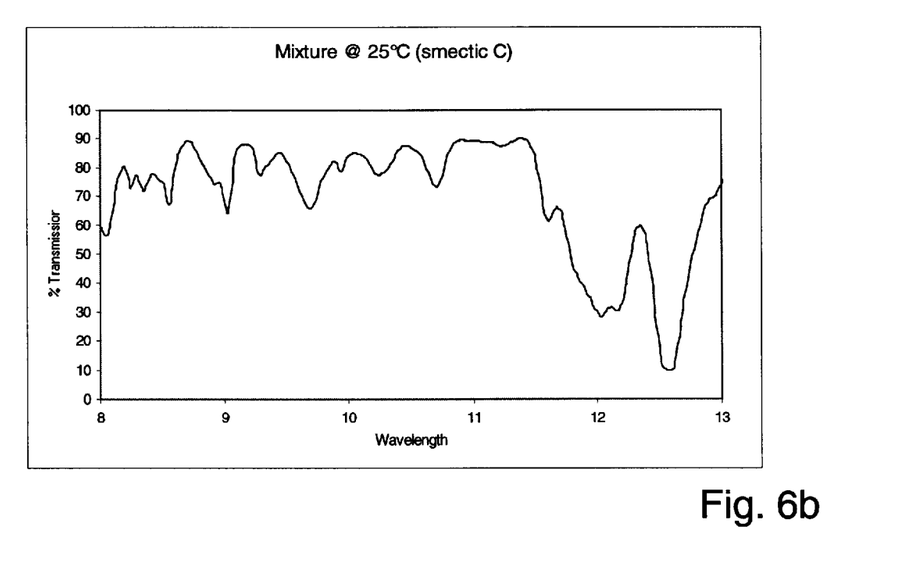

It was discovered that the spectra of a mixture changed with increasing temperature. The most likely explanation for this is that the change is not due to the temperature per se, but instead due to the phase change which accompanied the temperature change. Thus, the fact that the mixture's spectrum in the smectic C phase altered when it was melted may simply indicate that the degree and type of molecular interactions had changed. Since it is well-known that, in solution IR spectroscopy, the solvent used influences a material's IR spectra, this is not overly surprising. An example of this is shown in FIGS. 6a and 6b, where the top spectrum was run at 125° C. (in the isotropic phase), whereas the bottom spectrum was run at room temperature (in the smectic C phase). The differences between the two spectra are directly attributable to the different liquid crystal phases. The room temperature material is not aligned; were it aligned, the difference could potentially be noticeably larger.

It should be noted that, while the assessment spectra taken for compounds and mixtures were all taken in a 50 $\mu$m thick sample, the actual IR cells made with the mixtures had thicknesses proportional to their birefringence. For instance, in a cell tuned for optimal operation at 10.9 $\mu$m, a mixture with a birefringence of 0.22 would lead to a cell thickness of 25 $\mu$m, or half the "standard" thickness. From that we can estimate that a cell made with the mixture tested in FIGS. 6a and 6b would have half the absorption of the spectrum from FIG. 6b.

Uniform alignment of FLC materials is usually achieved through a process known as "surface stabilization." In order for this process to work, the thickness of the FLC layer has to be less than one quarter the pitch (length of a full rotation of the SmC* helix). The helical pitch of an FLC mixture may be in the range of 50 $\mu$m. The thickness of the cell may be roughly half this number. Therefore, strong surface stabilization may not be achieved. The resulting non uniformity in the FLC layer is not significant with respect to operation of an FLC IR chopper since it is the modulation of the intensity of incident radiation that is of primary importance, not the preservation of its spatially varying characteristics. However, in order for this FLC material to be useful in IR imaging or IR scene generation systems, the spatial uniformity problem would have to be addressed.

One approach to optimizing spatial uniformity is in the selection of an alignment layer material. Initially, we chose a material which, after cell fabrication, was observed to yield the best spatial uniformity. In the end, however, this was not how the optimal alignment layer material was chosen. Of the many materials tried, two polyamides yielded superior results: SE610 and SE5291 (Nissan Chemical Industries, Ltd., Japan). It was observed subsequently that the uniformity of cells incorporating SE610 would improve as cells were driven whereas the uniformity of cells incorporating SE5291 remained unchanged. SE5291 is known to have strong polar surface interactions with the FLC with which it is in contact; SE610 has much weaker interactions with the FLC. We speculate that the weaker interaction with SE610 allows the FLC to align itself when driven whereas the strong interaction with SE5291 prevents such "self alignment".

The polarizers 32 and 40 were fabricated with a lithographic manufacturing technology that was substantially less expensive and better suited to volume manufacturing than traditional manufacturing processes. For example traditional methods may cost on the order of $5000 per polarizer, while the method used to fabricate the polarizer of the present invention may be in the range of $100. Lift-off lithography was used to create wire grids 0.7 $\mu$m. wide on a pitch of 1.4 $\mu$m., resulting in a spacing between wires of 0.7 $\mu$m. The lift-off lithography process was performed by Digital Optics Corporation of Charlotte, N.C.

The transparent electrodes 34 and 38 may be composed of doped germanium. Typical FLC cells for use with visible light may include glass windows and a transparent electrode layer composed of a coating of indium tin oxide (ITO) deposited on the glass. Unfortunately, ITO is not transparent in the mid-infrared region, and neither are other conducting oxides that are transparent in the visible region. Germanium is fairly transparent in the mid-infrared region. In addition, the germanium can be doped to make it an n-type material. This allows the 4 layers of 2 windows and 2 electrode layers in conventional FLC cells to be replaced with 2 layers, since the window and electrode functionality are now in the same layer. N-doping was discovered to be preferable to p-doping because it provides for better ohmic contacts, although p-doping could be used as well. A thickness of 2 mm. for the germanium electrodes 34 and 38 was found to be suitable. Because the window material is conducting, it is necessary to house the chopper 24 such that the two electrodes 34 and 38 are insulated from each other.

Figure 7:
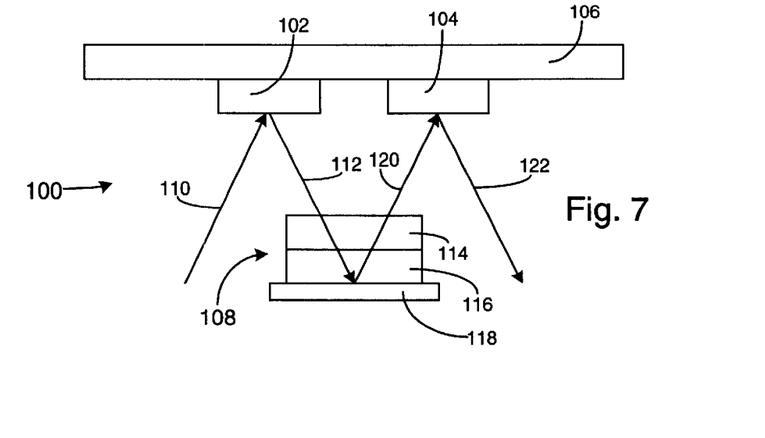
FIG. 7 is a first reflective embodiment of an FLC chopper of the present invention.

An alternative embodiment to an FLC IR chopper 100 is shown in FIG. 7. This embodiment includes a pair of reflective polarizers 102 and 104 placed in a co-planar fashion on a single substrate 106 and a reflective FLC cell 108 spaced apart therefrom. Unpolarized light 110 strikes the first reflective polarizer 102 and is reflected as linearly-polarized light 112 of a particular orientation. This light 112 is directed to the reflective FLC cell 108 which includes a window/electrode 114, a layer of FLC material 116, and a reflective electrode 118. The reflective electrode 118 may be composed of gold. The FLC cell 108 is configured so that it acts as a half waveplate only when the light passes twice therethrough due to the reflection. The result is linearly-polarized light 120 that has an orientation based on the orientation of the incoming linearly-polarized light 112 and the orientation and state of the FLC cell 108. This light 120 is then directed to the second reflective polarizer 104 which is oriented such that it will reflect linearly-polarized light of only a single orientation. If the incoming light 120 is linearly-polarized at an orientation orthogonal to the orientation of the second polarizer 104, then no light will be reflected, resulting in an OFF state for the chopper. Otherwise, linearly-polarized light 122 of the orientation of the second polarizer 104 will be reflected, resulting in an ON state for the chopper 100. One of many reasons a reflective embodiment may be desirable is because the number of window/electrodes is reduced from two to one, along with any associated AR coatings.

Figure 8:
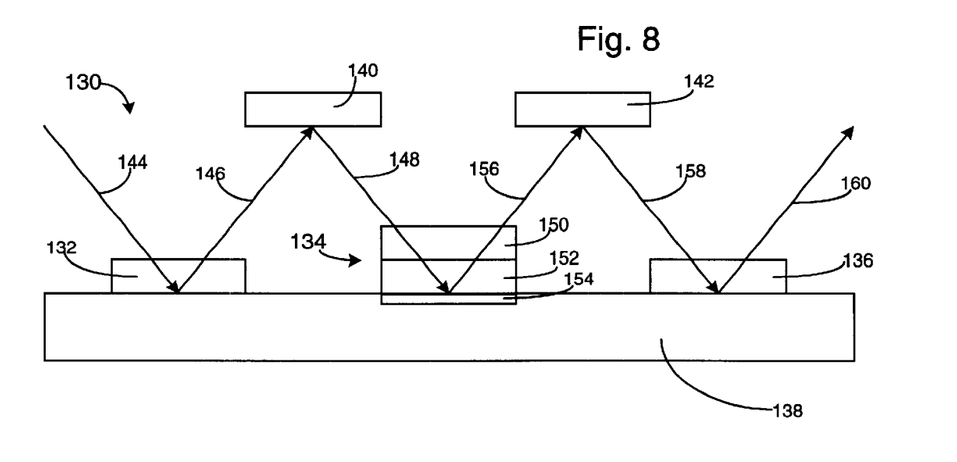
FIG. 8 is a second reflective embodiment of an FLC chopper of the present invention.

Another reflective embodiment of an FLC chopper 130 is shown in FIG. 8 the chopper includes a first reflective polarizer 132, a reflective FLC cell 134, and a second reflective polarizer 136 all located in a co-planar fashion on a single substrate 138. A pair of reflectors 140 and 142 (which could be replaced with a single reflector) are spaced apart from the substrate 138. Unpolarized light 144 strikes the first reflective polarizer 132 and is reflected as linearly-polarized light 146 of a particular orientation. This light 146 is reflected off of reflector 140 and directed as light 148 to the reflective FLC cell 134 which includes a window/electrode 150, a layer of FLC material 152, and a reflective electrode 154 which may be composed of gold. The FLC cell 134 is configured so that it acts as a half waveplate only when the light passes twice therethrough due to the reflection. The result is linearly-polarized light 156 that has an orientation based on the orientation of the incoming linearly-polarized light 148 and the orientation and state of the FLC cell 134. This light 156 is then directed to the reflector 142 where it is directed as light 158 to the second reflective polarizer 136 which is oriented such that it will reflect linearly-polarized light of only a single orientation. If the incoming light 158 is linearly-polarized at an orientation orthogonal to the orientation of the second polarizer 136, then no light will be reflected, resulting in an OFF state for the chopper. Otherwise, linearly-polarized light 160 of the orientation of the second polarizer 136 will be reflected, resulting in an ON state for the chopper 130. Because of the length of the light path, it may be necessary for the incoming unpolarized light 144 to be collimated.

Figure 9:
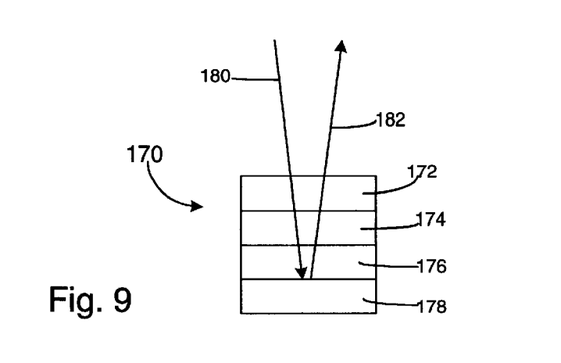
FIG. 9 is a third reflective embodiment of an FLC chopper of the present invention.

A third reflective embodiment of an FLC chopper 170 is shown in FIG. 9. The chopper 170 includes a polarizer 172, a window/electrode 174, an FLC layer 176, and a reflective electrode 178. Incoming unpolarized light 180 is directed to the FLC cell 170 where it first passes through a transmissive polarizer 172, allowing linearly-polarized light to pass through the window/electrode 174 and the FLC layer 176 where it is reflected by the reflective electrode 178 back through the FLC layer 176 and the window/electrode 174. The FLC cell 170 is configured such that it acts as a half waveplate when the light passes twice therethrough in this fashion. The polarizer 172 then either allows reflected light 182 to pass therethrough or it does not, depending on the orientation and state of the FLC layer 176. Note that in this parallel polarizer arrangement, the contrast ratio between the ON and the OFF states may be somewhat reduced from a crossed polarizer arrangement. It may also be possible to use a beam splitter arrangement or a polarized beamsplitter arrangement with this FLC cell 170 or in any of the other embodiments shown.

Figure 10:
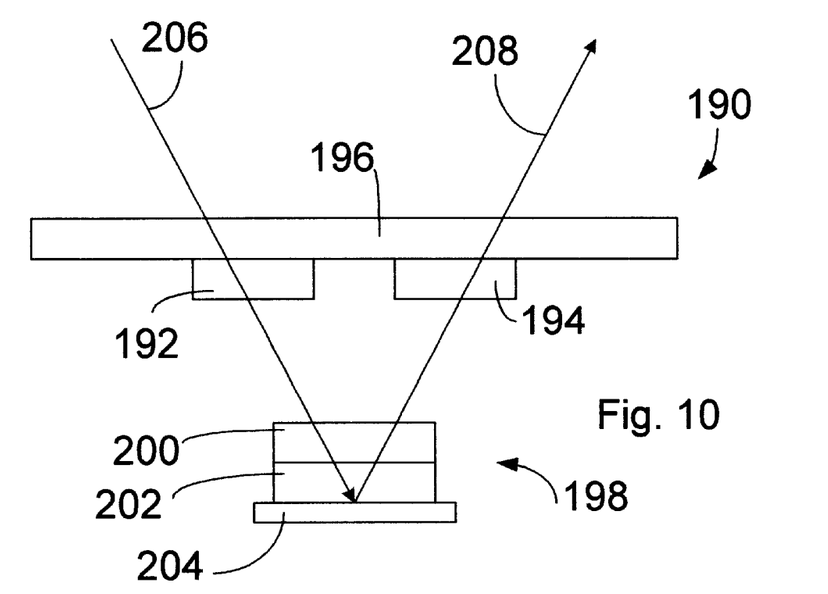
FIG. 10 is a fourth reflective embodiment of an FLC chopper of the present invention.

A fourth reflective embodiment of an FLC chopper 190 is shown in FIG. 10. The chopper 190 includes a first transmissive polarizer 192 and a second transmissive polarizer 194, both located on a single substrate 196 that is, or has portions that are, transmissive to IR light. An FLC cell 198 includes a window/electrode 200, an FLC layer 202, and a reflective electrode 204. Incoming unpolarized light 206 first passes through the first transmissive polarizer 192, allowing linearly-polarized light to pass through the window/electrode 200 and the FLC layer 202 where it is reflected by the reflective electrode 204 back through the FLC layer 202 and the window/electrode 200. The FLC cell 198 is configured such that it acts as a half waveplate when the light passes twice therethrough in this fashion. The second transmissive polarizer 194 then either allows reflected light 208 to pass therethrough or it does not, depending on the orientation and state of the FLC layer 202. Note that the polarizers 192 and 194 could be oriented in a parallel polarizer arrangement or in a crossed polarizer arrangement.

The foregoing description is considered as illustrative only of the principles of the invention. Furthermore, since numerous modifications and changes will readily occur to those skilled in the art, it is not desired to limit the invention to the exact construction and process shown and described above. For example, the principles of the present invention may be equally applicable to various types of liquid crystal devices, such as those including nematic liquid crystals, ferroelectric liquid crystals, polymer dispersed liquid crystals, and others. Furthermore, the particular order, position, and relationship of the various layers and optical components of the chopper of the present invention could be changed as needed. Additionally, while the FLC chopper of the present invention has been described with regard to an application for a gas monitoring system, this is but one example of possible applications for the chopper. Also, for many applications sufficient performance may be obtained even without the optimal orientations, rotations, and retardances described. For example, the polarizers might not need to be exactly parallel or perpendicular, the waveplate might not need to be exactly a half waveplate, the rotation of the optical axis might not need to be exactly 45 degrees, and so forth. Accordingly, all suitable modifications and equivalents may be regarded as falling within the scope of the invention as defined by the claims which follow.

We claim:

1. A liquid crystal infrared light modulator that can be driven by electrical signals to modulate incoming infrared light, comprising:

a polarizer receptive of the incoming light that produces polarized light;

a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state;

a pair of IR transparent, conductive substrates positioned on either side of the liquid crystal layer that are suitable for having voltages applied thereto to drive the liquid crystal layer to one of the two states; and an analyzer that substantially blocks polarized light of the first polarization state when the liquid crystal layer is in the first state and substantially passes polarized light of the second polarization state when the liquid crystal layer is in the second state;

wherein the liquid crystal material is a ferroelectric liquid crystal material that has an average transmissivity across the electromagnetic spectrum from 8–13 μm greater than 50%.

2. An infrared light modulator according to claim 1, wherein the ferroelectric liquid crystal material has a birefringence greater than 0.17 at a wavelength of 589 nm.

3. An infrared light modulator according to claim 1, wherein at least one of the conductive substrates includes Germanium.

4. An infrared light modulator according to claim 3, wherein the Germanium is doped to increase the conductivity thereof.

5. An infrared light modulator according to claim 1, wherein at least one of the polarizer and the analyzer are constructed by a lithographic process.

6. An infrared light modulator according to claim 1, wherein the polarizer and analyzer are in a crossed-polarizer configuration relative to one another.

7. A liquid crystal infrared light modulator that can be driven by electrical signals to modulate incoming infrared light, comprising:

a polarizer receptive of the incoming light that produces polarized light;

a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state;

an analyzer that substantially blocks polarized light of the first polarization state when the liquid crystal layer is in the first state and substantially passes polarized light of the second polarization state when the liquid crystal layer is in the second state;

a first conductive substrate positioned on one side of the liquid crystal layer, the first substrate having a reflector thereon that reflects IR light such that incoming polarized light passes twice through the liquid crystal layer before passing through the analyzer; and a second conductive substrate transparent to IR light positioned on the opposite side of the liquid crystal layer from the first substrate, the first and second substrates cooperating to modulate the liquid crystal layer between the two states;

wherein the liquid crystal material is a ferroelectric liquid-crystal material that has an average transmissivity across the electromagnetic spectrum from 8–13 μm greater than 50%.

8. An infrared light modulator according to claim 7, wherein the ferroelectric liquid crystal material has a birefringence greater than 0.17 at a wavelength of 589 nm.

9. An infrared light modulator according to claim 7, wherein at least one of the conductive substrates includes Germanium.

10. An infrared light modulator according to claim 9, wherein the Germanium is doped to increase the conductivity thereof.

11. An infrared light modulator according to claim 7, wherein at least one of the polarizer and the analyzer are constructed by a lithographic process.

12. An infrared light modulator according to claim 7, wherein the polarizer and analyzer are in a crossed-polarizer configuration relative to one another.

13. A liquid crystal infrared light modulator that modulates incoming polarized IR light such that the IR light is either substantially blocked or passed by an analyzer after traveling through the modulator, the modulator comprising:

a pair of conductive substrates; and a layer of liquid crystal material positioned between the substrates, the liquid crystal layer operating between at least two states, a first state that provides a first polarization state of polarized light from the incoming polarized IR light and a second state that provides a second polarization state of polarized light from the incoming polarized IR light;

wherein the conductive substrates can be driven by electrical signals to modulate the liquid crystal between the two states, the substrates and the liquid crystal layer configured in either of two configurations, a transmissive configuration, wherein the IR light passes through the liquid crystal layer only once, and a reflective configuration, wherein the IR light passes through the liquid crystal layer twice;

and further wherein the liquid crystal material is a ferroelectric liquid crystal material that has an average transmissivity across the electromagnetic spectrum from 8—13 μm greater than 50%.

14. An infrared light modulator according to claim 13, wherein the ferroelectric liquid crystal material has a birefringence greater than 0.17 at a wavelength of 589 nm.

15. An infrared light modulator according to claim 13, wherein at least one of the conductive substrates includes Germanium.

16. An infrared light modulator according to claim 15, wherein the Germanium is doped to increase the conductivity thereof.

17. An infrared light modulator according to claim 13, wherein at least one of the polarizer and the analyzer are constructed by a lithographic process.

18. An infrared light modulator according to claim 13, wherein the polarizer and analyzer are in a crossed-polarizer configuration relative to one another.

19. An infrared detection system that analyzes the characteristics of a composition of matter, the detection system comprising:

a source of infrared light;

an IR chopper that alternately substantially passes and substantially blocks light from the IR light source, the chopper including, a polarizer receptive of incoming infrared light that produces polarized light;

a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state;

a pair of IR transparent, conductive substrates positioned on either side of the liquid crystal layer for modulating the liquid crystal layer between the two states; and an analyzer that substantially blocks polarized light of the first polarization state when the liquid crystal layer is in the first state and substantially passes polarized light of the second polarization state when the liquid crystal layer is in the second state;

wherein the liquid crystal material is a ferroelectric liquid crystal material that has an average transmissivity across the electromagnetic spectrum from 8–13 μm greater than 50%; and an IR detector that senses the IR light after the IR light passes through the composition of matter;

wherein the composition of matter is located such that the IR light passes therethrough either before or after the IR light passes through the liquid crystal IR chopper.

20. An infrared detection system according to claim 19, wherein the ferroelectric liquid crystal material has a birefringence greater than 0.17 at a wavelength of 589 nm.

21. An infrared detection system according to claim 19, wherein at least one of the conductive substrates includes Germanium.

22. An infrared detection system according to claim 21 wherein the Germanium is doped to increase the conductivity thereof.

23. An infrared detection system according to claim 19, wherein at least one of the polarizer and the analyzer are constructed by a lithographic process.

24. An infrared detection system according to claim 19, wherein the polarizer and analyzer are in a crossed-polarizer configuration relative to one another.

25. A liquid crystal infrared light modulator that can be driven by electrical signals to modulate incoming infrared light, comprising:

a reflective polarizer receptive of the incoming light that produces polarized light;

a liquid crystal cell including:

a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state;

a first conductive substrate positioned on one side of the liquid crystal layer, the first substrate having a reflector thereon that reflects IR light; and a second conductive substrate transparent to IR light positioned on the opposite side of the liquid crystal layer from the first substrate, the first and second substrates cooperating to modulate the liquid crystal layer between the two states; and a reflective analyzer that substantially blocks polarized light of the first polarization state when the liquid crystal layer is in the first state and substantially passes polarized light of the second polarization state when the liquid crystal layer is in the second state;

wherein the reflector of the first conductive substrate reflects IR light such that incoming polarized light passes twice through the liquid crystal layer before passing through the analyzer; and wherein at least two of the polarizer, the liquid crystal cell, and analyzer are positioned in a substantially coplanar relationship with one another.

26. An infrared light modulator according to claim 25, wherein the liquid crystal material is ferroelectric.

27. An infrared light modulator according to claim 25, wherein the ferroelectric liquid crystal material has a birefringence greater than 0.17 at a wavelength of 589 nm.

28. An infrared light modulator according to claim 25, wherein the ferroelectric liquid crystal material has an average transmissivity across the electromagnetic spectrum from 8–13 μm greater than 50%.

29. An infrared light modulator according to claim 25, wherein at least one of the conductive substrates includes Germanium.

30. An infrared light modulator according to claim 29, wherein the Germanium is doped to increase the conductivity thereof.

31. An infrared light modulator according to claim 25, wherein at least one of the polarizer and the analyzer are constructed by a lithographic process.

32. An infrared light modulator according to claim 25, wherein the polarizer and analyzer are in a crossed-polarizer configuration relative to one another.

33. A liquid crystal light modulator as defined in claim 25, wherein the reflective polarizer and the reflective analyzer are located on the same planar surface.

34. A liquid crystal light modulator as defined in claim 33, wherein the liquid crystal cell is also located on the same planar surface.

35. A liquid crystal light modulator as defined in claim 33, wherein the liquid crystal cell is located on a second surface opposite from the planar surface.

36. A liquid crystal infrared light modulator that can be driven by electrical signals to modulate incoming infrared light, comprising:

a wire grid polarizer receptive of the incoming light that produces polarized light;

a layer of liquid crystal material switchable between at least two states, the liquid crystal layer acting on polarized IR light from the polarizer to provide a first polarization state of polarized light if the liquid crystal is in a first state and to provide a second polarization state of polarized light if the liquid crystal is in a second state;

a pair of IR transparent, conductive, semiconductor substrates positioned on either side of the liquid crystal layer that are suitable for having voltages applied thereto to drive the liquid crystal layer to one of the two states; and a wire grid analyzer that substantially blocks polarized light of the first polarization state when the liquid crystal layer is in the first state and substantially passes polarized light of the second polarization state when the liquid crystal layer is in the second state;

wherein the semiconductor substrates are sufficiently rigid to serve as mechanical container walls to hold the layer of liquid crystal therebetween and also to serve as the substrate on which the wire grid polarizer and analyzer are carried.

* * * * *